United States Patent
Taniuchi et al.

(10) Patent No.: US 12,040,468 B2
(45) Date of Patent: Jul. 16, 2024

(54) BATTERY MODULE

(71) Applicant: HONDA MOTOR CO., LTD., Tokyo (JP)

(72) Inventors: Takuya Taniuchi, Saitama (JP); Masahiro Ohta, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 600 days.

(21) Appl. No.: 17/275,673

(22) PCT Filed: Sep. 25, 2018

(86) PCT No.: PCT/JP2018/035364
§ 371 (c)(1),
(2) Date: Mar. 12, 2021

(87) PCT Pub. No.: WO2020/065709
PCT Pub. Date: Apr. 2, 2020

(65) Prior Publication Data
US 2022/0045387 A1     Feb. 10, 2022

(51) Int. Cl.
*H01M 10/6556*     (2014.01)
*H01M 10/613*     (2014.01)
(Continued)

(52) U.S. Cl.
CPC ..... *H01M 10/6556* (2015.04); *H01M 10/613* (2015.04); *H01M 10/647* (2015.04);
(Continued)

(58) Field of Classification Search
None
See application file for complete search history.

(56) References Cited

U.S. PATENT DOCUMENTS

| | | | |
|---|---|---|---|
| 2012/0171532 A1 | 7/2012 | Lee et al. | |
| 2014/0193678 A1* | 7/2014 | Kim | H01M 50/507 |
| | | | 429/72 |

FOREIGN PATENT DOCUMENTS

| | | | | |
|---|---|---|---|---|
| DE | 102008059947 A1 | 6/2010 | | |
| JP | 2013/069558 | * | 4/2013 | ........ H01M 10/0562 |

(Continued)

OTHER PUBLICATIONS

English translation of JP 2013/069558 (Year: 2013).*
Office Action issued in the DE Patent Application No. 112018008015. 3, mailed on May 24, 2023.

*Primary Examiner* — Yoshitoshi Takeuchi
(74) *Attorney, Agent, or Firm* — CKC & Partners Co., LLC

(57) ABSTRACT

A battery module is provided with: battery cells comprising all-solid-state batteries having a positive electrode layer, a negative electrode layer, and a solid electrolyte layer; a support plate on which the battery cells are mounted; and a cooling medium channel through which a cooling medium for cooling the support plate flows, wherein electrode terminals are provided so as to project from one surface of the battery cells, bus bars capable of electrically connecting to the electrode terminals are provided on a battery cell mounting surface, the bus bars are in thermal contact with the support plate, and the battery cells are mounted on the support plate by causing one surface of the battery cells to face the cell mounting surface and electrically connecting the electrode terminals to the bus bars.

8 Claims, 8 Drawing Sheets

(51) Int. Cl.
  *H01M 10/615* (2014.01)
  *H01M 10/647* (2014.01)
  *H01M 10/653* (2014.01)
  *H01M 10/655* (2014.01)
  *H01M 10/6554* (2014.01)
  *H01M 10/6568* (2014.01)
  *H01M 10/658* (2014.01)
  *H01M 50/209* (2021.01)
  *H01M 50/507* (2021.01)
  *H01M 10/0562* (2010.01)

(52) U.S. Cl.
  CPC ..... *H01M 10/653* (2015.04); *H01M 10/6568* (2015.04); *H01M 10/658* (2015.04); *H01M 50/209* (2021.01); *H01M 50/507* (2021.01); *H01M 10/0562* (2013.01)

(56) References Cited

FOREIGN PATENT DOCUMENTS

| | | |
|---|---|---|
| JP | 2013069558 A | 4/2013 |
| JP | 2013516739 A | 5/2013 |
| JP | 5540114 B2 | 7/2014 |
| JP | 2018073518 A | 5/2018 |
| WO | 2011138156 A1 | 11/2011 |

* cited by examiner

Prior Art

BATTERY MODULE

TECHNICAL FIELD

The present invention relates to a battery module.

BACKGROUND ART

Generally, battery cells of lithium ion secondary batteries and other batteries mounted in vehicles such as hybrid electric vehicles and electric vehicles are each filled in a sealed manner with an electrolytic solution, together with electrode plates, in a cell case. FIG. 7 illustrates an ordinary battery cell 100. The battery cell 100 includes an explosion-proof valve (safety valve) 103 allowing an excess of gas generated in a cell case 101 to exit. Since the battery cell 100 contains an electrolytic solution, the explosion-proof valve 103 is provided on a sealing plate 101a serving as a top surface of the cell case 101 to prevent the electrolytic solution from occluding the explosion-proof valve 103. The explosion-proof valve 103 is thus disposed to face upward. Normally, since a positive-negative pair of electrode terminals 102 are provided to project from the sealing plate 101a, the electrode terminals 102 are also inevitably disposed to project upward.

By the way, it is necessary that a battery cell that generates heat through charging and discharging of electricity be cooled, from a viewpoint of durability. Conventionally, a bottom surface of a battery cell where electrode terminals are disposed to project upward (an opposite surface of a surface provided with the electrode terminals disposed to project upward) has been caused to be in thermal contact with a support plate that is to be cooled by a cooling mechanism such as a water jacket to wholly cool the battery cell.

FIG. 8 schematically illustrates a relationship between the cooling mechanism and the battery cell in this case. The battery cell 100 provided with the electrode terminals 102 disposed to project upward is mounted in such a manner that a bottom surface 101b of the cell case 101 is in thermal contact with a support plate 200 via a heat-transfer sheet 301. In the cell case 101 of the battery cell 100, electrode plates 105 are respectively accommodated in insulating bags 104. An outer surface of the cell case 101 is covered with an insulating film 106. The support plate 200 is mounted on and in thermal contact with a water jacket 400 through which a cooling medium flows, via a heat-transfer sheet 302.

In the cooling structure described above, heat generated in the electrode plates 105 is transferred, as illustrated with an arrow in FIG. 8, along a route from the electrode plates 105→the insulating bags 104→the cell case 101→the insulating film 106→the heat-transfer sheet 301→the support plate 200→the heat-transfer sheet 302→the water jacket 400→the cooling medium. Heat exchange thus takes place with the cooling medium, achieving cooling.

Patent Document 1: Japanese Unexamined Patent Application, Publication No. 2013-69558

DISCLOSURE OF THE INVENTION

Problems to be Solved by the Invention

However, in the cooling structure described above, heat generated in the electrode plates in the battery cell is transferred via many parts until heat exchange takes place with the cooling medium, leading to large thermal resistance. In addition, even though the electrode terminals in the battery cell are directly connected to the electrode plates, and promptly receive heat from the electrode plates, and are thus regarded as portions that most easily generate heat, the electrode terminals are disposed farthest away from the cooling medium. Due to the reasons described above, a problem of the conventional cooling structure is that the battery cell cooling efficiency is extremely low.

To solve the problem, an object of the present invention is to provide a battery module including battery cells with improved cooling efficiency.

Means for Solving the Problems (1) A battery module according to the present invention is a battery module (for example, a battery module 1, described later) including: battery cells (for example, battery cells 2, described later) that are all-solid-state batteries each having a positive electrode layer (for example, a positive electrode layer 201, described later), a negative electrode layer (for example, a negative electrode layer 202, described later) and a solid electrolyte layer (for example, a solid electrolyte layer 203, described later); a support plate (for example, a support plate 3, described later) on which the battery cells are mounted; and a cooling medium channel (for example, a cooling medium channel 41, described later) through which a cooling medium for cooling the support plate flows, in which electrode terminals (for example, a positive electrode terminal 23a and a negative electrode terminal 23b, described later) are provided to project from one surface (for example, a sealing plate 22, described later) of each of the battery cells, bus bars (for example, bus bars 5, described later) capable of electrically connecting to the electrode terminals are provided on a battery cell mounting surface, the bus bars are in thermal contact with the support plate, and the battery cells are mounted on the support plate by causing the one surface of each of the battery cells to face the battery cell mounting surface and electrically connecting the electrode terminals to the bus bars.

With the battery module described above in (1), it is possible to significantly reduce in number parts on a heat-transfer route between each of the battery cells and the cooling mechanism, improving the battery cells cooling efficiency.

(2) In the battery module described in (1), the bus bars may each have electrode terminal insertion holes (for example, electrode terminal insertion holes 51, described later) allowing the electrode terminals to be inserted, and the electrode terminals may be removably secured to the electrode terminal insertion holes of the bus bars.

With the battery module described above in (2), it is possible to simply insert the electrode terminals into the bus bars to mount the battery cells on the battery cell mounting surface of the support plate, achieving an extremely easy mounting operation. It is also possible to simply pull the electrode terminals out of the bus bars to easily remove the battery cells from the battery cell mounting surface.

(3) In the battery module described in (1) or (2), the bus bars may be provided in recessed portions (for example, bus bar accommodation recessed portions 32, described later) formed on the battery cell mounting surface.

With the battery module described above in (3), it is possible to secure large areas with which the bus bars and the support plate are in thermal contact with each other, achieving further efficient cooling of the electrode terminals of the battery cells via the bus bars.

(4) In the battery module described in any one of (1) to (3), a positive-negative pair of the electrode terminals may be provided to project downward from a bottom surface (for example, a sealing plate 22, described later) of each of the battery cells, and the battery cell mounting surface may be provided on a top surface of the support plate.

With the battery module described above in (4), the battery cells are mounted on the top surface of the support plate, achieving an easy mounting operation of the battery cells.

(5) In the battery module described in any one of (1) to (4), the battery cells may each have a flat, rectangular parallelepiped shape, and a plurality of the battery cells may be arranged in parallel to each other in a thickness direction on the battery cell mounting surface.

With the battery module described above in (5), it is possible to arrange in a compact manner the plurality of battery cells on the support plate.

Effects of the Invention

According to the present invention, it is possible to provide a battery module including battery cells with improved cooling efficiency.

PREFERRED MODE FOR CARRYING OUT THE INVENTION

Figure 1:
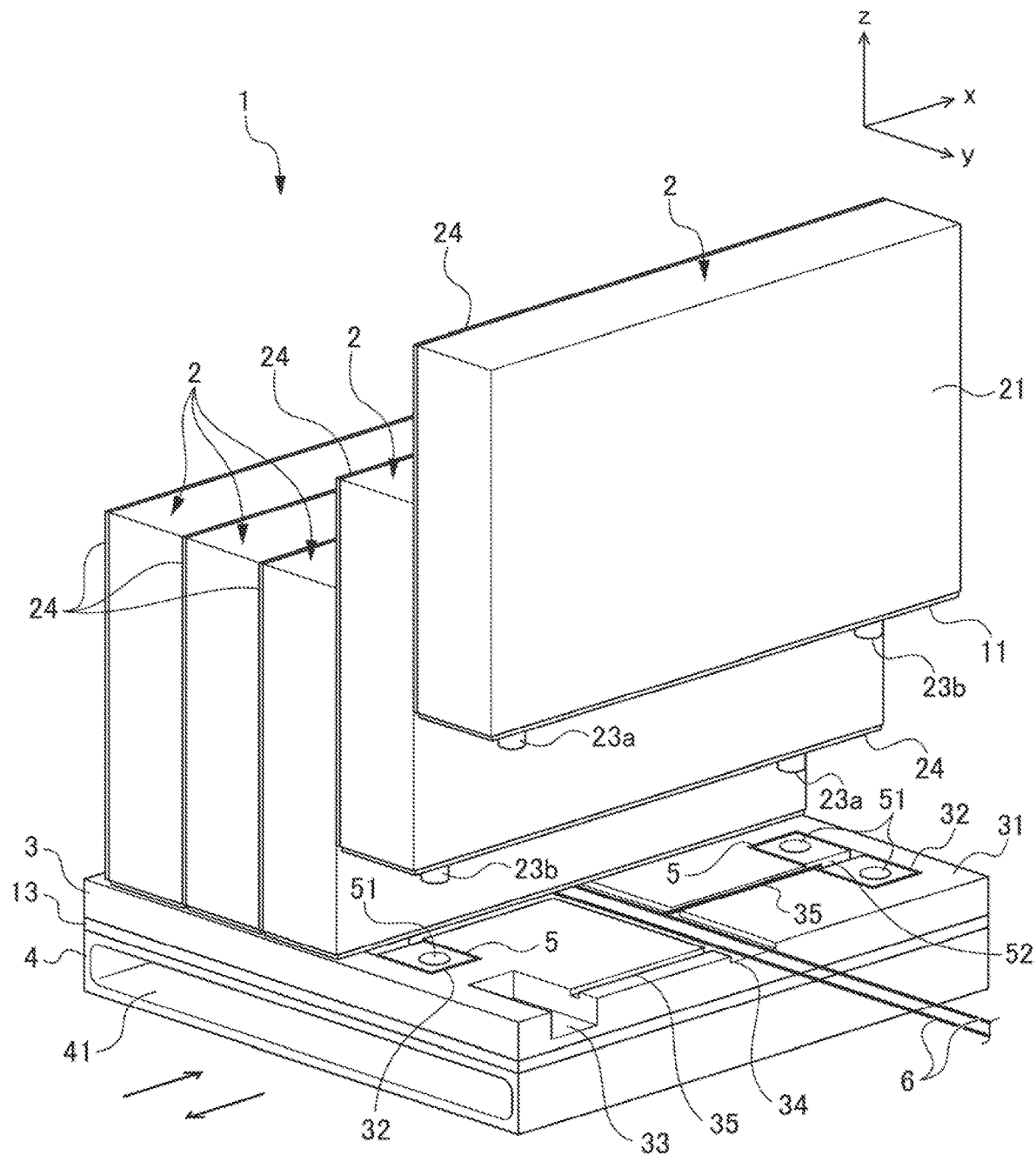
FIG. 1 is a perspective view illustrating an embodiment of a battery module according to the present invention.

An embodiment of the present invention will now be described herein with reference to the accompanying drawings. As illustrated in FIG. 1, a battery module 1 according to the embodiment includes a plurality of battery cells 2, a support plate 3 supporting the plurality of battery cells 2 mounted in a stacked state in a y direction, and a water jacket 4 that cools the support plate 3. Note that, as for directions described below in the drawings, the directions of x, y, and z represent directions orthogonal to each other. The x direction represents a width direction of the battery cells 2. The y direction represents a thickness direction of the battery cells 2. The z direction represents a height direction of the battery cells 2. In the embodiment, the direction designated as the z direction also represents an opposite direction to a gravity direction, and an upper direction of the battery module 1.

Figure 2:
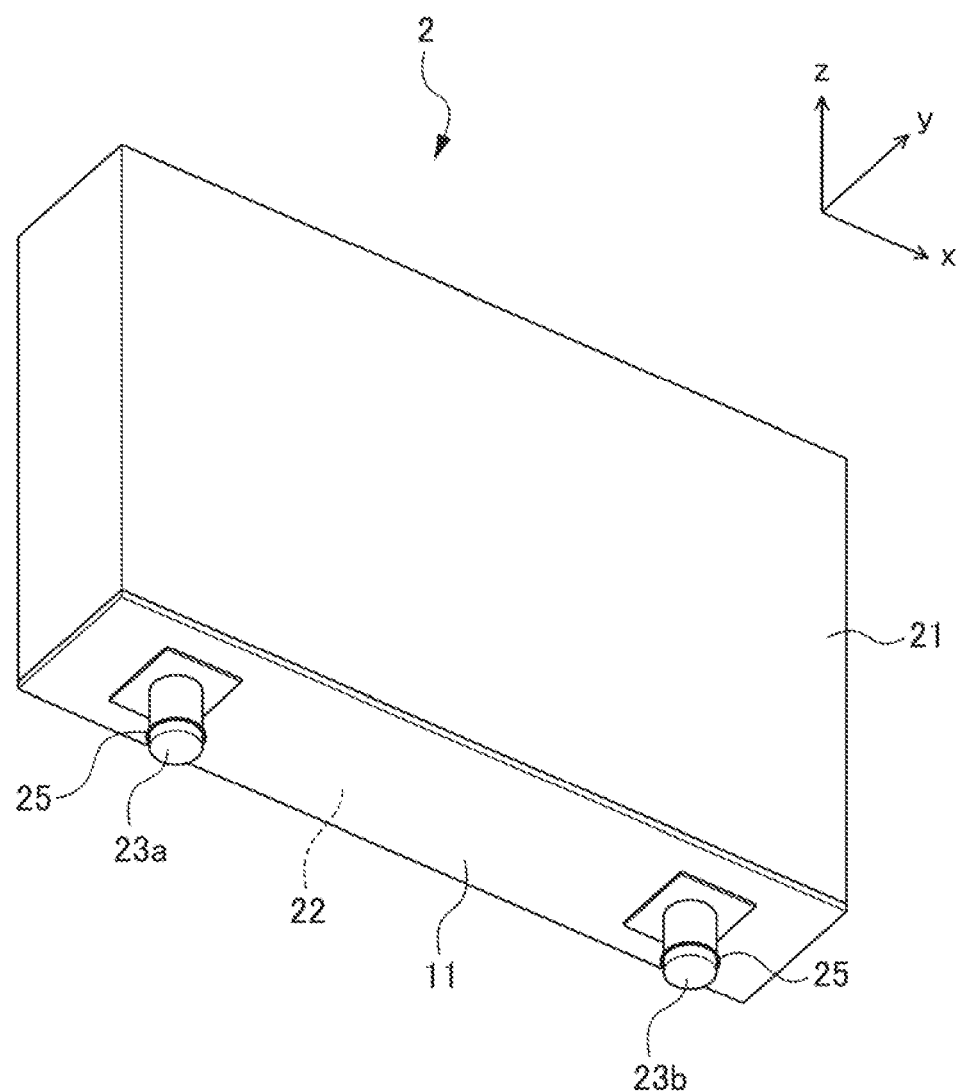
FIG. 2 is a perspective view of a battery cell, when seen from a bottom surface side.

The battery cells 2 according to the embodiment are all-solid-state batteries that contain no electrolytic solution. The battery cells 2 each accommodate electrode plates 20 (FIG. 3), respectively in cell cases 21. As illustrated in FIG. 2, the cell cases 21 are made of aluminum or aluminum alloy, for example. The cell cases 21 are each open on a bottom surface side. The cell cases 21 each have a flat, rectangular parallelepiped box shape in the y direction. Bottom surfaces of the battery cells 2 (bottom surfaces of the cell cases 21) are respectively closed by sealing plates 22 each made from a metal plate also made of aluminum or aluminum alloy, for example.

A positive electrode terminal 23a and a negative electrode terminal 23b, which are electrode terminals respectively and electrically connected to the electrode plates 20 located internally, are provided to project downward from each of the sealing plates 22. The positive electrode terminal 23a and the negative electrode terminal 23b according to the embodiment each have a cylindrical shape, and are disposed away from each other in the width direction of the battery cells 2. A heat-transfer sheet 11 is applied to a surface of each of the sealing plates 22. The heat-transfer sheet 11 is made from a sheet of silicone having a heat transfer property and an electrically insulating property, for example. The positive electrode terminal 23a and the negative electrode terminal 23b pass through the heat-transfer sheet 11 and project downward.

Figure 3:
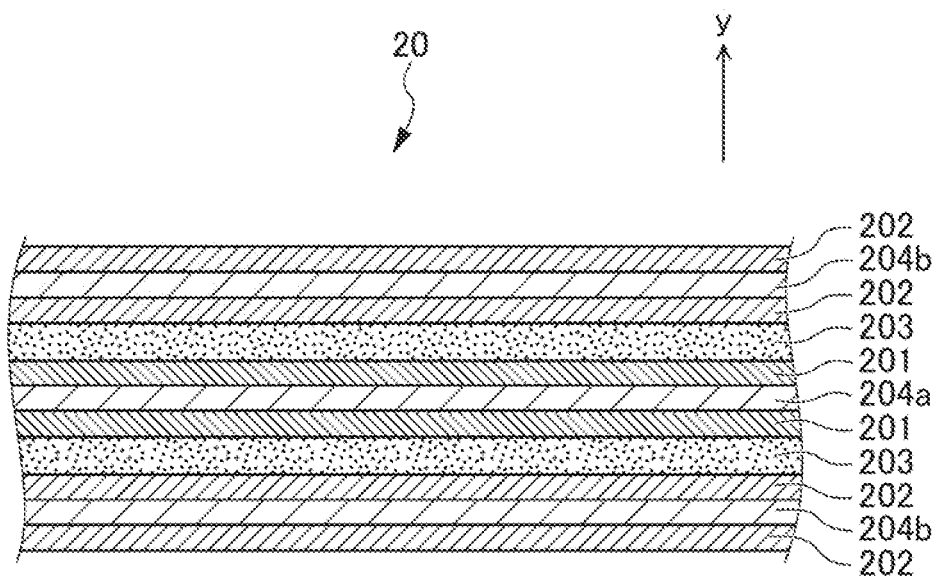
FIG. 3 is a cross-sectional view illustrating a structure of an electrode plate accommodated in the battery cell.

As illustrated in FIG. 3, the electrode plates 20 each include, in an integrally stacked manner in the y direction, a plurality of positive electrode layers 201, a plurality of negative electrode layers 202, a plurality of solid electrolyte layers 203, a plurality of positive electrode electric collectors 204a, and a plurality of negative electrode electric collectors 204b. The positive electrode layers 201 each contain a positive electrode active material, and are applied to both surfaces of each of the positive electrode electric collectors 204a. The negative electrode layers 202 each contain a negative electrode active material, and are applied to both surfaces of each of the negative electrode electric collectors 204b. The solid electrolyte layers 203 each contain a solid-state electrolyte having an ion conductive property, and are each provided between one of the positive electrode layers 201 and one of the negative electrode layers 202. The positive electrode electric collectors 204a and the negative electrode electric collectors 204b are made from metallic foils of aluminum, copper, or Steel Use Stainless, for example. The electrode plates 20 including the layers described above are each given a predetermined load (an initial load) in a stacking direction, and are thus each compressed in the y direction. The electrode plates 20 that are compressed are respectively accommodated in non-illustrated insulating bags, and are then respectively accommodated in the cell cases 21 together with the insulating bags. The positive electrode terminal 23a is electrically connected to the positive electrode electric collectors 204a of each of the electrode plates 20. The negative electrode terminal 23b is electrically connected to the positive electrode electric collectors 204a of each of the electrode plates 20.

Figure 4:
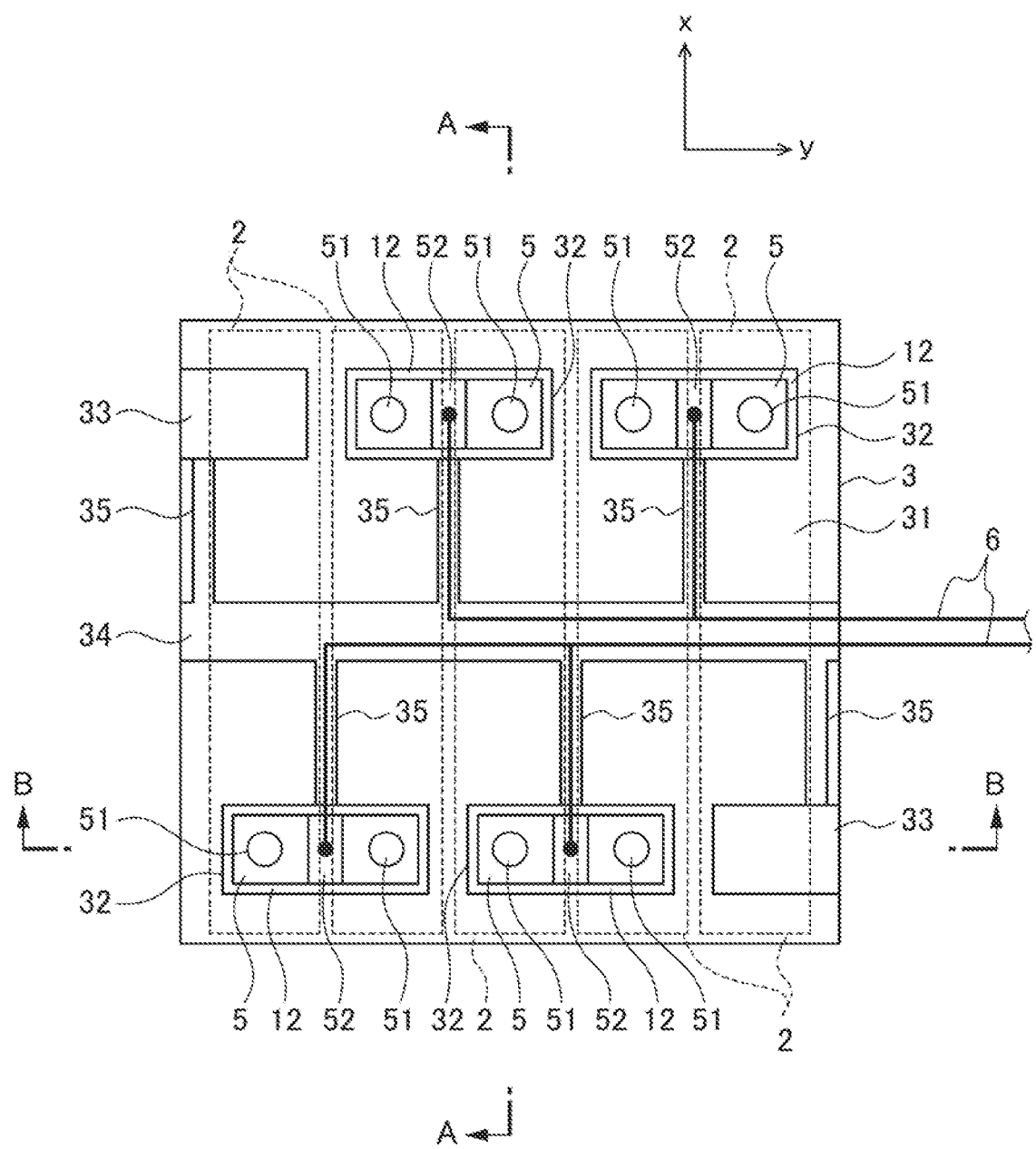
FIG. 4 is a plan view illustrating a support plate of the battery module according to the present invention.
Figure 5:
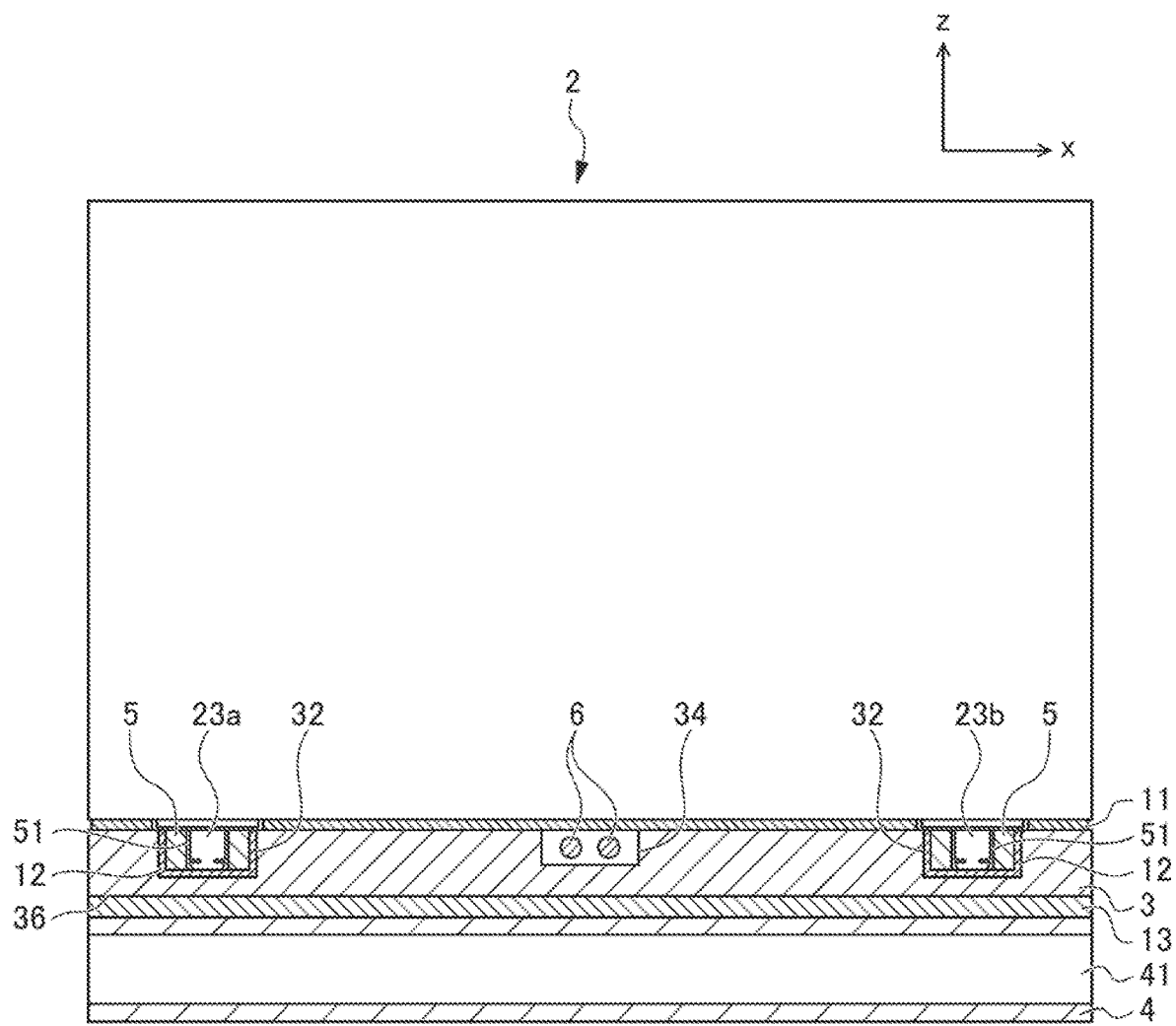
FIG. 5 is a cross-sectional view of the battery module according to the present invention, taken along line A-A in FIG. 4.

The support plate 3 is made from a metal plate of aluminum or aluminum alloy, for example, or a flat plate having a heat transfer property, such as a ceramic plate of aluminum nitride, for example. As illustrated in FIGS. 1 and 4, a top surface of the support plate 3 serves as a battery cell mounting surface 31 onto which the plurality of battery cells 2 are mounted. Although, in the support plate 3 according to the embodiment, as illustrated in FIGS. 1 and 4, it is possible to mount the five battery cells 2 arranged in the thickness direction on the battery cell mounting surface 31, the battery cells 2 to be mounted are not limited in number. A size of the support plate 3 is appropriately set in accordance with the number of the battery cells 2 to be mounted on the battery cell mounting surface 31.

The battery cell mounting surface 31 of the support plate 3 is provided with a plurality of bus bars 5. The bus bars 5 are electrically-conductive members each electrically connecting the electrode terminals of the two battery cells 2 and 2 lying adjacent to each other. The bus bars 5 are made of a metallic material such as aluminum, stainless steel, or copper. The bus bars 5 are each formed into a rectangular shape, when viewed in a plan view. The bus bars 5 are each formed to have a thickness approximately identical to a projection height of each of the positive electrode terminal 23a and the negative electrode terminal 23b of each of the battery cells 2. The support plate 3 according to the embodiment includes the four bus bars 5 disposed in such a manner that respective longitudinal directions are aligned in the y direction. The four bus bars 5 are separated into two by two and disposed on the battery cell mounting surface 31 in the x direction at intervals each corresponding to a separation interval of a pair of the electrode terminals 23 and 23 of each of the battery cells 2. Each two of the bus bars 5 separated into two by two in the x direction are aligned in a straight line extending in the y direction.

The bus bars 5 each have a pair of electrode terminal insertion holes 51 and 51 allowing for the positive electrode terminal 23a and the negative electrode terminal 23b of the battery cells 2 to be inserted. The pair of electrode terminal insertion holes 51 and 51 are aligned in a straight line extending in the y direction. The interval of the pair of the electrode terminal insertion holes 51 and 51 of each of the bus bars 5 corresponds to the interval of the electrode terminals lying adjacent to each other when the two battery cells 2 and 2 are stacked in the y direction. The two bus bars 5 and 5 aligned in a straight line extending in the y direction are disposed to allow the four electrode terminal insertion holes 51 to respectively align with each other at constant intervals. The two bus bars 5 and 5 on one side and the two bus bars 5 and 5 on another side, which are separated from each other in the x direction, are displaced from each other at pitches each corresponding to a thickness of each of the battery cells 2. When the bus bars 5 are observed in the x direction, the electrode terminal insertion holes 51 and 51 of the bus bars 5 and 5 separated from each other in the x direction are respectively disposed to align in straight lines extending in the x direction.

The bus bars 5 are respectively disposed in bus bar accommodation recessed portions 32 formed on the battery cell mounting surface 31, via heat-transfer sheets 12 made of a material similar to the material of the heat-transfer sheet 11. The bus bar accommodation recessed portions 32 each have a slightly greater rectangular shape than the planar shape of each of the bus bars 5. The bus bar accommodation recessed portions 32 are each provided in a recessed manner with a slightly deeper size than a size of the thickness of each of the bus bars 5 from the battery cell mounting surface 31. Specifically, a depth of each of the bus bar accommodation recessed portions 32 corresponds to a size acquired by adding the thickness of each of the bus bars 5 and a thickness of each of the heat-transfer sheets 12. As the bus bars 5 are accommodated in the bus bar accommodation recessed portions 32 via the heat-transfer sheets 12, lower surfaces and four side surfaces of the bus bars 5 are respectively and wholly covered by the heat-transfer sheets 12. Therefore, large contact areas between the support plate 3 and the bus bars 5 via the heat-transfer sheets 12 are secured. Top surfaces of the bus bars 5 accommodated in the bus bar accommodation recessed portions 32 are disposed approximately flush with the battery cell mounting surface 31.

The bus bars 5 that are disposed in the bus bar accommodation recessed portions 32 via the heat-transfer sheets 12 are in thermal contact with the support plate 3. In the present invention, the term "in thermal contact with" means that heat is allowed to be transferred between two members (in here, between the support plate 3 and each of the bus bars 5). Although, in the embodiment, the heat-transfer sheets 12 are respectively present between the support plate 3 and the bus bars 5, heat transfer members other than the heat-transfer sheets 12 may be present, as long as the heat transfer members have a heat transfer property (a heat transfer property and an electrically insulating property, when the support plate 3 has an electrically conductive property). When the support plate 3 has no electrically conductive property, no heat transfer member may be present, and the support plate 3 and the bus bars 5 may be in direct contact with each other.

The battery cell mounting surface 31 of the support plate 3 is provided with two electrode terminal accommodation recessed portions 33 and 33, in addition to the bus bar accommodation recessed portions 32. The electrode terminal accommodation recessed portions 33 are each provided in a recessed manner at a depth identical to the depth of each of the bus bar accommodation recessed portions 32. The electrode terminal accommodation recessed portions 33 are disposed one by one at both end portions in the y direction of the support plate 3. The electrode terminal accommodation recessed portions 33 each accommodate, when the plurality of battery cells 2 are mounted on the battery cell mounting surface 31, as will be described later, the positive electrode terminal 23a or the negative electrode terminal 23b of each of the battery cells 2 and 2 disposed on both ends in the y direction. The electrode terminal accommodation recessed portions 33 and 33 are respectively open laterally from the both end portions in the y direction of the support plate 3. Therefore, when the electrode terminal accommodation recessed portions 33 accommodate the positive electrode terminal 23a and the negative electrode terminal 23b, it is possible to electrically connect, from each side of the support plate 3, a non-illustrated harness and/or a bus bar to the positive electrode terminal 23a or the negative electrode terminal 23b.

Furthermore, the battery cell mounting surface 31 of the support plate 3 is provided with a main groove 34 and six branch grooves 35. The main groove 34 extends in the y direction on a central portion in the x direction of the support plate 3. Both ends of the main groove 34 are open on the sides of the support plate 3. The branch grooves 35 are disposed to correspond to the four bus bar accommodation recessed portions 32 and the two electrode terminal accommodation recessed portions 33. The branch grooves 35 respectively extend in the x direction. The branch grooves 35 respectively connect the corresponding bus bar accommodation recessed portions 32 and the corresponding electrode terminal accommodation recessed portions 33 to the main groove 34. The main groove 34 and the branch grooves 35 each have an identical depth. The depth is shallower than the depth of each of the bus bar accommodation recessed portions 32 and the electrode terminal accommodation recessed portions 33.

The main groove 34 and the branch grooves 35 are respectively provided with voltage detection lines 6. Ends of the voltage detection lines 6 are electrically connected to the bus bars 5 through welding and/or bonding, for example. The voltage detection lines 6 extend from the bus bars 5, via the branch grooves 35 and main groove 34, to outside of the support plate 3. Other ends of the voltage detection lines 6 are electrically connected to an electrical circuit such as a non-illustrated cell voltage sensor (CVS). The voltage detection lines 6 that are accommodated in the main groove 34 and the branch grooves 35 do not project upward above the battery cell mounting surface 31.

The bus bars 5 are respectively provided with recessed portions 52 extending in the x direction between a pair of the electrode terminal insertion holes 51 and 51. The recessed portions 52 are respectively disposed on lines extending from the branch grooves 35. The ends of the voltage detection lines 6 are respectively and electrically connected to the bus bars 5 in the recessed portions 52. Therefore, the voltage detection lines 6 respectively do not project upward from the top surfaces of the bus bars 5.

Figure 6:
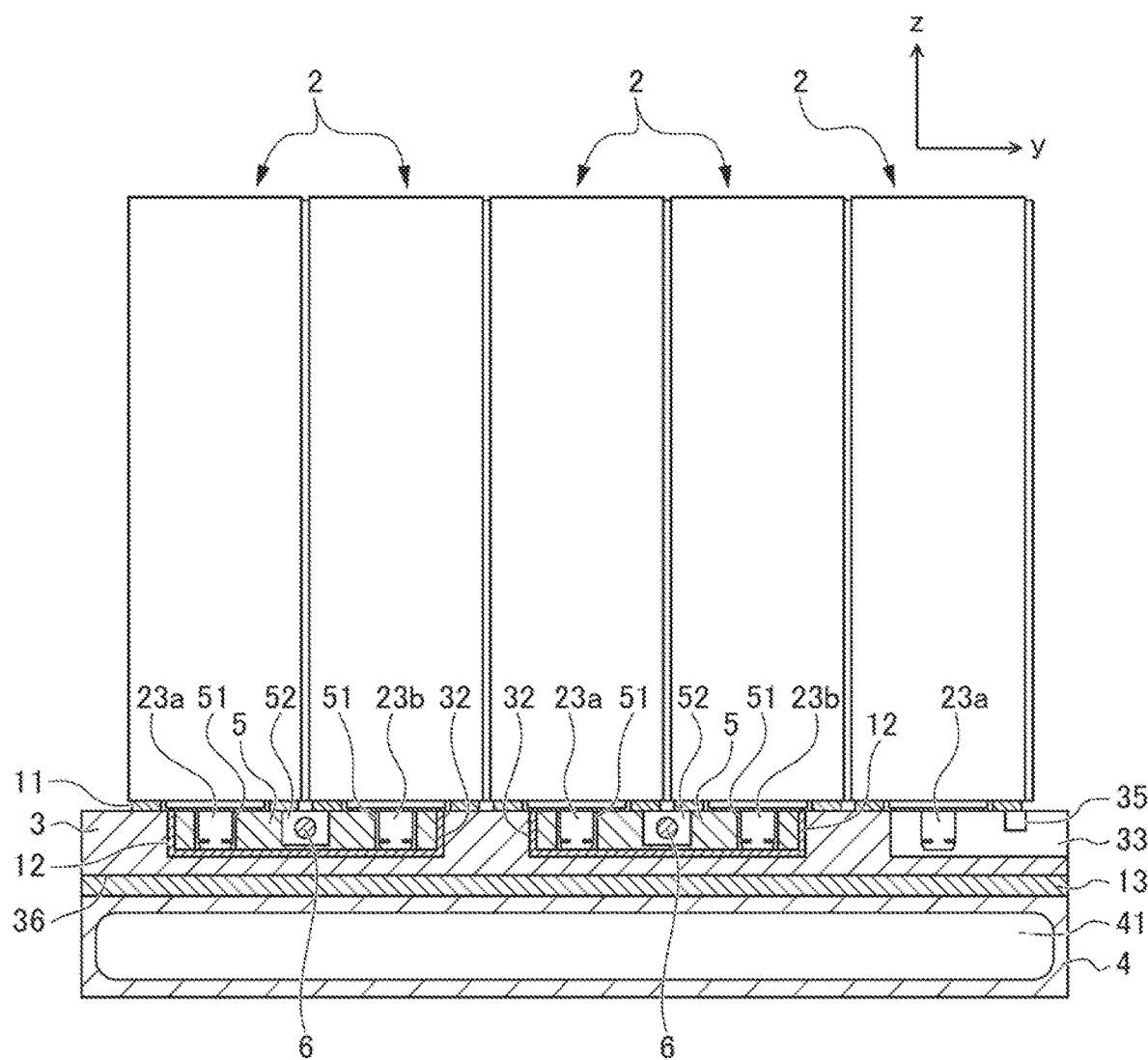
FIG. 6 is a cross-sectional view of the battery module according to the present invention, taken along line B-B in FIG. 4.
Figure 7:
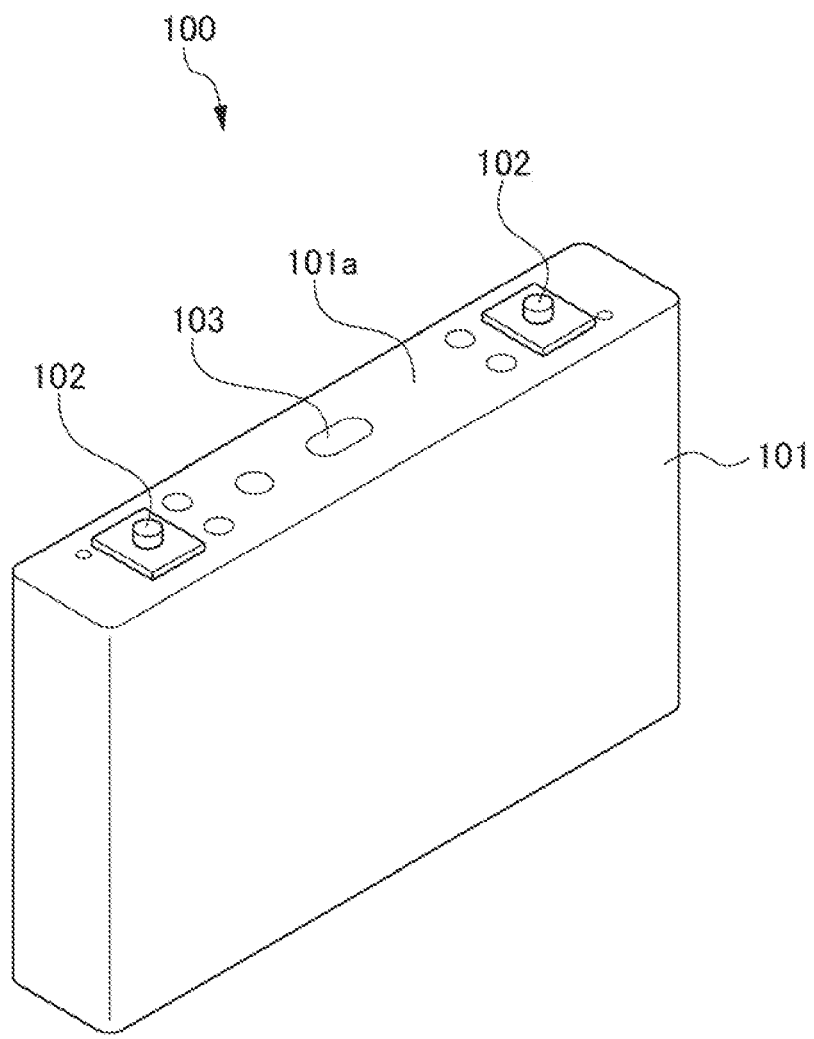
FIG. 7 is a perspective view illustrating an example of a battery cell containing an electrolytic solution.
Figure 8:
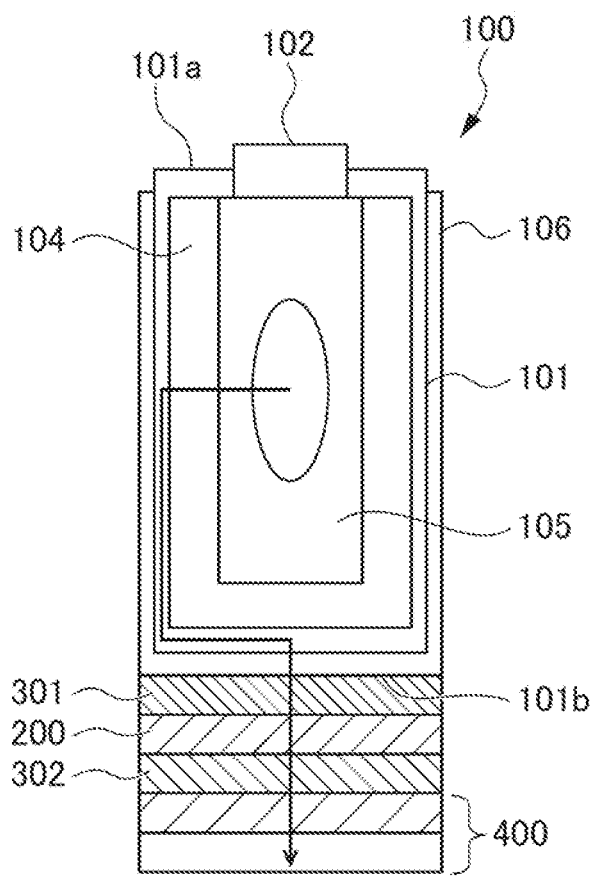
FIG. 8 is a schematic view illustrating a heat-transfer route in the conventional battery cell.

The water jacket 4 is made of a metallic material having a higher heat transfer property, such as aluminum or copper. The water jacket 4 is disposed on a lower surface 36 side of the support plate 3. Specifically, the water jacket 4 is stacked onto the lower surface 36 of the support plate 3 via a heat-transfer sheet 13 made of a material similar to the material of the heat-transfer sheet 11. Therefore, the support plate 3 and the water jacket 4 are in thermal contact with each other. The water jacket 4 has a cooling medium channel 41 extending in the x direction. As illustrated in FIGS. 1 and 6, a width in the y direction of the cooling medium channel 41 has a size corresponding to the size in the thickness direction of all the battery cells 2 mountable on the battery cell mounting surface 31 of the support plate 3. The water jacket 4 through which a cooling medium flows in the cooling medium channel 41, as illustrated with arrows in FIG. 1, cools the support plate 3 via the heat-transfer sheet 13. Although cooling liquid is generally used as a cooling medium, gas (air) may be used.

In the battery module 1 according to the embodiment, the five battery cells 2 are mounted on the battery cell mounting surface 31 disposed on the top surface of the support plate 3. That is, while the sealing plates 22 of the battery cells 2 are caused to face the battery cell mounting surface 31, a pair of the positive electrode terminal 23a and the negative electrode terminal 23b projecting downward from each of the sealing plates 22 are respectively inserted, from above the support plate 3, into the electrode terminal insertion holes 51 and 51 of each two of the bus bars 5 and 5 disposed away from each other in the x direction of the support plate 3. Therefore, the positive electrode terminal 23a and the negative electrode terminal 23b are electrically connected to the bus bars 5. Since the battery cells 2 are all-solid-state batteries, even when the positive electrode terminal 23a and the negative electrode terminal 23b are mounted to face downward, such a problem of an electrolytic solution occluding an explosion-proof valve does not occur. In the battery cells 2, the positive electrode terminal 23a and the negative electrode terminal 23b are provided to project downward from each of the sealing plates 22 serving as the bottom surfaces, and the battery cell mounting surface 31 is provided on the top surface of the support plate 3, achieving an easy mounting operation of the battery cells 2.

When a pair of the positive electrode terminal 23a and the negative electrode terminal 23b are inserted into deeper positions in the electrode terminal insertion holes 51 and 51, the heat-transfer sheet 11 applied to the surface of each of the sealing plates 22 comes into contact with the battery cell mounting surface 31. Therefore, the cell cases 21 of the battery cells 2 are each in thermal contact with the support plate 3 via the heat-transfer sheet 11. Similarly, the five battery cells 2 are stacked and arranged on the battery cell mounting surface 31 in the thickness direction (the y direction). Therefore, it is possible to arrange in a compact manner the five battery cells 2 on the support plate 3. Between the battery cells 2 and 2 lying adjacent to each other, as illustrated in FIG. 1, an insulating plate 24 is disposed.

Note that, in the battery cells 2 and 2 lying adjacent to each other, orientations of the positive and negative electrode terminals are alternated. That is, when the stacked five battery cells 2 are observed in the y direction, the positive electrode terminals 23a and the negative electrode terminals 23b are alternately disposed. Therefore, a pair of the electrode terminal insertion holes 51 and 51 of each of the bus bars 5 are inserted with the positive electrode terminal 23a of adjacent one of the battery cells 2 and the negative electrode terminal 23b of another adjacent one of the battery cells 2. Therefore, the five battery cells 2 are connected in series by the four bus bars 5. Among the five battery cells 2, one of the electrode terminals of the two battery cells 2 and 2 disposed on the both ends in the y direction (the positive electrode terminal 23a of one of the battery cells 2 and the negative electrode terminal 23b of another one of the battery cells 2) is accommodated in one of the electrode terminal accommodation recessed portions 33 of the support plate 3, and is then electrically connected to a non-illustrated harness and/or a bus bar.

In the battery module 1, the cooling medium flowing in the cooling medium channel 41 in the water jacket 4 cools the support plate 3. As the support plate 3 is cooled, the positive electrode terminals 23a and the negative electrode terminals 23b of the battery cells 2, which are inserted into the bus bars 5, are cooled via the bus bars 5 being in thermal contact with the support plate 3. That is, the battery cells 2 are cooled through heat exchange between the positive electrode terminals 23a and the negative electrode terminals 23b directly connected to the electrode plates 20 and the bus bars 5 on the support plate 3 that is cooled with the water jacket 4.

Therefore, since, in the battery module 1, it is possible to cool, with the water jacket 4, the positive electrode terminals 23a and the negative electrode terminals 23b that are portions that most easily generate heat, outside of the battery cells 2, it is possible to significantly reduce in number the parts through which heat generated in the electrode plates 20 in the battery cells 2 is transferred until heat exchange takes place with the cooling medium, compared with a conventional case where a bottom surface of a battery cell is cooled, achieving effective cooling of the battery cells 2. In addition, since, in the battery module 1, the sealing plates 22 of the battery cells 2 are in thermal contact with the support plate 3 via the heat-transfer sheets 11, it is possible to cool the battery cells 2 with the sealing plates 22, further improving the battery cells 2 cooling efficiency.

In addition, since, in the embodiment, the bus bars 5 provided on the support plate 3 are provided in the bus bar accommodation recessed portions 32 formed in the battery cell mounting surface 31, it is possible to secure large areas where the bus bars 5 and the support plate 3 are in thermal contact with each other, achieving further efficient cooling of the positive electrode terminals 23a and the negative electrode terminals 23b of the battery cells 2 via the bus bars 5.

The positive electrode terminals 23a and the negative electrode terminals 23b of the battery cells 2 may be removably secured to the electrode terminal insertion holes 51 of the bus bars 5. Therefore, it is possible to simply insert the positive electrode terminals 23a and the negative electrode terminals 23b into the electrode terminal insertion holes 51 of the bus bars 5 to secure the battery cells 2 on the battery cell mounting surface 31 of the support plate 3, achieving an extremely easy mounting operation of the battery cells 2. It is also possible to simply pull the positive electrode terminal 23a and the negative electrode terminal 23b out of the bus bars 5 to easily remove and exchange a desired one of the battery cells 2 from the battery cell mounting surface 31, for example.

For a means of removably securing the positive electrode terminals 23a and the negative electrode terminals 23b to the electrode terminal insertion holes 51 of the bus bars 5, it is possible to appropriately adopt a known means. In the embodiment, as illustrated in FIG. 2, elastic rings 25 are respectively provided externally around the positive electrode terminals 23a and the negative electrode terminals 23b. The elastic rings 25 elastically shrink in diameter when the positive electrode terminals 23a and the negative electrode terminals 23b are inserted into the electrode terminal insertion holes 51, to secure, with its elastic restoring force, the positive electrode terminals 23a and the negative electrode terminals 23b in the electrode terminal insertion holes 51. In the electrode terminal insertion holes 51 of the bus bars 5, elastic members such as plate springs that cause its locking force or holding force to act on the positive electrode terminals 23a and the negative electrode terminals 23b may be provided.

It is possible to variously alter the battery module according to the present invention within the technical idea of the present invention. For example, although, in the embodiment described above, the plurality of battery cells 2 are connected in series with the bus bars 5, the plurality of battery cells 2 may be connected in parallel with the bus bars. The battery cells 2 and 2 lying adjacent to each other may not be in close contact with each other. The battery cells 2 and 2 lying adjacent to each other may be arranged at a predetermined gap.

Although, in the embodiment described above, the water jacket 4 having the cooling medium channel 41 is stacked onto the lower surface 36 of the support plate 3 via the heat-transfer sheet 13, the present invention is not limited to the configuration. For example, a cooling medium channel may be provided in the support plate 3. In this case, the heat-transfer sheet 13 is not required, further improving the cooling efficiency.

The support plate 3 is not limited to one that the battery cell mounting surface 31 is disposed to face upward in the gravity direction. For example, the support plate 3 may be disposed to allow the battery cell mounting surface 31 to incline with respect to the gravity direction. The support plate 3 may otherwise be disposed to allow the battery cell mounting surface 31 to expand in a vertical direction.

EXPLANATION OF REFERENCE NUMERALS

1 Battery module
2 Battery cell
21 Sealing plate
23a Positive electrode terminal
23b Negative electrode terminal
201 Positive electrode layer
202 Negative electrode layer
203 Solid electrolyte layer
3 Support plate
32 Bus bar accommodation recessed portion
41 Cooling medium channel
5 Bus bar
51 Electrode terminal insertion hole

The invention claimed is:

1. A battery module comprising:
battery cells that are all-solid-state batteries each having a positive electrode layer, a negative electrode layer, and a solid electrolyte layer;
a support plate on which the battery cells are mounted; and
a cooling medium channel through which a cooling medium for cooling the support plate flows, wherein
electrode terminals are provided to project from one surface of each of the battery cells to which a heat-transfer sheet is applied,
bus bars capable of electrically connecting to the electrode terminals are provided on a battery cell mounting surface, the battery cell mounting surface is a top surface of the support plate on which the battery cells are mounted,
the bus bars are disposed, via a second heat-transfer sheet, in bus bar accommodation recessed portions formed on the battery cell mounting surface and are in thermal contact with the support plate, and
the battery cells are mounted on the support plate by causing the one surface of each of the battery cells to face the battery cell mounting surface and electrically connecting the electrode terminals to the bus bars.

2. The battery module according to claim 1, wherein
the bus bars each have electrode terminal insertion holes allowing for the electrode terminals to be inserted, and
the electrode terminals are removably secured to the electrode terminal insertion holes of the bus bars.

3. The battery module according to claim 1, wherein
a positive-negative pair of the electrode terminals are provided to project downward from a bottom surface of each of the battery cells, and
the battery cell mounting surface is provided on a top surface of the support plate.

4. The battery module according to claim 1, wherein
the battery cells each have a flat, rectangular parallelepiped shape, and
a plurality of the battery cells are arranged in parallel to each other in a thickness direction on the battery cell mounting surface.

5. The battery module according to claim 1, wherein the bus bar accommodation recessed portions have a depth of a size in which a thickness of the bus bars is added to a thickness of the second heat-transfer sheet.

6. The battery module according to claim 1, wherein the electrode terminals are provided in electrode terminal accommodation recessed portions formed on the battery cell mounting surface.

7. The battery module according to claim 1, wherein the support plate is non-electrically conducting, and the support plate and the bus bars are in direct contact with each other.

8. The battery module according to claim 1, wherein the support plate is sheet-shaped and has a constant thickness, the cooling medium channel has a constant thickness and forms a cavity so that the cooling medium can flow.

* * * * *